United States Patent
Aamir et al.

(10) Patent No.: US 11,970,426 B1
(45) Date of Patent: Apr. 30, 2024

(54) ENHANCED NITROGEN AND PHOSPHATE FERTILIZER RECOVERY BY FERRIC CHLORIDE FROM SEWAGE SLUDGE AND CORN STOVER

(71) Applicant: KING FAISAL UNIVERSITY, Al Hasa (SA)

(72) Inventors: Muhammad Aamir, Al Hasa (SA); Muhammad Hassan, Al Hasa (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

(21) Appl. No.: 18/530,085

(22) Filed: Dec. 5, 2023

(51) Int. Cl.
*C05B 17/00* (2006.01)
(52) U.S. Cl.
CPC ................... *C05B 17/00* (2013.01)
(58) Field of Classification Search
CPC ....................................... C05B 17/00
See application file for complete search history.

(56) References Cited

PUBLICATIONS

Jiang, Huier, et al. "Hydrothermal carbonization of corn straw in biogas slurry." Journal of cleaner production 353 (2022): 131682. (Year: 2022).*

Khawer, Muhammad Usmaan Bin, et al. "Anaerobic digestion of sewage sludge for biogas & biohydrogen production: State-of-the-art trends and prospects." Fuel 329 (2022): 125416. (Year: 2022).*

Abd Hamid, Sharifah Bee, Swe Jyan Teh, and You Sing Lim. "Catalytic hydrothermal upgrading of α-cellulose using iron salts as a lewis acid." BioResources 10.3 (2015): 5974-5978. (Year: 2015).*

Sludge Processing. "Sludge treatment—hydrothermal processes" <https://www.sludgeprocessing.com/non-oxidative-thermochemical-treatment/hydrothermal-process-treating-sludge/> May 18, 2020 (Year: 2020).*

Michela Langone et al., "Process Waters from Hydrothermal Carbonization of Sludge: Characteristics and Possible Valorization Pathways", International Journal of Environmental Research and Public Health 2020, 17, 6618, pp. 1-31, First available online on Sep. 11, 2020.

Shuang E et al., "Synthesis of Al-modified hydrochar from corn stover for 2 efficient phosphate removal", Research Paper, First available online on Aug. 22, 2023.

Abhishek Pokharel et al., "Biochar-Assisted Wastewater Treatment and Waste Valorization", Applications of Biochar for Environmental Safety IntechOpen; 2020, pp. 1-19, First available online on Jan. 3, 2022.

Huan Deng et al., "Preparation, Properties, and Application of Biochar for Improving Sewage Sludge Dewatering Performance: A Review", Water 2023, 15, 1796, pp. 1-15, First available online on May 8, 2023.

Tiago Teribele et al., "Hydrothermal Carbonization of Corn Stover: Structural Evolution of Hydro-Char and Degradation Kinetics", Energies 2023, 16, 3217, pp. 1-22, First available online on Apr. 3, 2023.

* cited by examiner

*Primary Examiner* — Jennifer A Smith
(74) *Attorney, Agent, or Firm* — Nath, Goldberg & Meyer; Richard C. Litman

(57) ABSTRACT

A method of enhancing nitrogen and phosphate fertilizer recovery and, particularly, to using sewage sludge and corn stover to enhance nitrogen and phosphate fertilizer recovery. The methods can further use ferric chloride as a catalyst to further enhance nitrogen recovery. The fertilizer can be produced by hydrothermally carbonizing a mixture including about 20% of sewage sludge and about 30% of corn stover.

14 Claims, No Drawings

ENHANCED NITROGEN AND PHOSPHATE FERTILIZER RECOVERY BY FERRIC CHLORIDE FROM SEWAGE SLUDGE AND CORN STOVER

BACKGROUND

1. Field

The present disclosure relates to enhancing nitrogen and phosphate fertilizer recovery and, particularly, to using sewage sludge and corn stover to enhance nitrogen and phosphate fertilizer recovery.

2. Description of the Related Art

Sewage sludge and corn stover are two of the primary bioresources found abundantly. Sewage sludge is also considered as a serious pollutant for the environment and its disposal is an ongoing issue for waste management authorities.

Hydrothermal carbonization of sewage sludge is a treatment process in which high temperature and pressure is applied in the presence of moisture and the substrate is converted into a carbon rich subject like fertilizer.

Thus, methods for making use of these materials, particularly the sewage sludge waste material, and for enhancing fertilizer recovery solving the aforementioned problems are desired.

SUMMARY

In an embodiment, the present subject matter relates to a method of enhancing nitrogen and phosphate fertilizer recovery and, particularly, to using sewage sludge and corn stover to enhance nitrogen and phosphate fertilizer recovery. The methods can further use ferric chloride as a catalyst to further enhance nitrogen recovery. The fertilizer can be produced by hydrothermally carbonizing, or hydro carbonizing, a mixture including about 20% of sewage sludge and about 30% of corn stover.

Accordingly, in one embodiment, the present subject matter relates to a method of obtaining a nitrogen and phosphorous containing fertilizer, the method comprising: providing a mixture of about 70% sewage sludge and about 30% corn stover, by weight; hydrothermally carbonizing the mixture to provide a slurry; and obtaining the nitrogen and phosphorous containing fertilizer.

In another embodiment, the present subject matter relates to a nitrogen and phosphorous containing fertilizer produced according to the methods described herein.

In an additional embodiment, the present subject matter relates to a method of fertilizing soil, comprising providing the nitrogen and phosphorous containing fertilizer as described herein; contacting the nitrogen and phosphorous containing fertilizer with the soil; and fertilizing the soil.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of enhancing nitrogen and phosphate fertilizer recovery and, particularly, to using sewage sludge and corn stover to enhance nitrogen and phosphate fertilizer recovery. The methods can further use ferric chloride as a catalyst to further enhance nitrogen recovery. The fertilizer can be produced by hydrothermally carbonizing, or hydro carbonizing, a mixture including about 20% of sewage sludge and about 30% of corn stover.

Accordingly, in one embodiment, the present subject matter relates to a method of obtaining a nitrogen and phosphorous containing fertilizer, the method comprising: providing a mixture of about 70% sewage sludge and about 30% corn stover, by weight; hydrothermally carbonizing the mixture to provide a slurry; and obtaining the nitrogen and phosphorous containing fertilizer.

In an embodiment, the mixture of the present methods can be hydrothermally carbonized at a temperature of about 200° C. to about 280° C. In another embodiment, the mixture can be hydrothermally carbonized at a pressure of about 3 bars. In a further embodiment, the mixture can be hydrothermally carbonized with a reaction time of about 4 to about 6 hours and a biomass and water ratio of about 1:10.

In an additional embodiment, the nitrogen and phosphorous containing fertilizer can have an about 6.25% nitrogen content and an about 5.62% phosphate content as measured on a dry weight basis.

In one embodiment, the mixture can further comprise ferric chloride ($FeCl_3$). In this regard, the ferric chloride can act as a catalyst in the hydrothermal carbonization process. When present, the mixture can comprise about 5 mg/kg of the ferric chloride on a dry weight basis. The addition of the ferric chloride can result in the nitrogen and phosphorous containing fertilizer having an about 6.67% nitrogen content and/or about 4 mg/kg of iron as measured on a dry weight basis.

In another embodiment, the corn stover can provide rigid body and pulverized structure to the fertilizer as compared with a fertilizer produced by the sewage sludge alone. Further, the organic nitrogen and phosphatic contents in the resultant fertilizer composition, when produced based on an about 70% sewage sludge+an about 30% corn stover mixture, can be higher than for all other compositions mixing these two components, and from fertilizers produced using sewage sludge or corn stover when taken alone. The corn stover presence can also enhance the ion exchange capacity and ion transfer efficiency of the nitrogen and phosphate contents in the fertilizer when the fertilizer is mixed in the soil. The addition of corn stover can also enhance the buffering capacity of the fertilizer and enhance its ion exchange efficiency.

In another embodiment, the present subject matter relates to a nitrogen and phosphorous containing fertilizer produced according to the methods described herein.

In an additional embodiment, the present subject matter relates to a method of fertilizing soil, comprising providing the nitrogen and phosphorous containing fertilizer as described herein; contacting the nitrogen and phosphorous containing fertilizer with the soil; and fertilizing the soil.

In one embodiment, the fertilized soil can be kitchen gardening soil.

In another embodiment, the nitrogen and phosphorous containing fertilizer can reduce nitrogen loss in the soil by up to 20%.

The present subject matter can be better understood by referring to the following examples.

EXAMPLES

Example 1

Preparation of Fertilizer

The fertilizer was produced by subjecting a mixture including 70% sewage sludge and 30% corn stover to hydro-carbonization at a temperature of 200-280° C., at a pressure of 3 bars, with a reaction time of 4-6 hours, while maintaining a biomass and water ratio of 1/10 in the reactor. The produced slurry was then characterized in terms of its nitrogen and phosphate contents. The produced organic fertilizer was characterized as having 6.25% nitrogen contents and 5.62% phosphate contents as measured on a dry weight basis.

Example 2

Preparation of Iron Containing Fertilizer

The fertilizer was produced by subjecting a mixture including a 70% sewage sludge and 30% corn stover mixture plus 5 mg/kg on a dry weight basis of ferric chloride ($FeCl_3$). to hydro-carbonization at a temperature of 200-280° C., at a pressure of 3 bars, with a reaction time of 4-6 hours, while maintaining a biomass and water ratio of 1/10 in the reactor. The produced slurry was then characterized in terms of its nitrogen and phosphate contents. The produced organic fertilizer was characterized as having 6.67% nitrogen contents and 5.62% phosphate contents as measured on a dry weight basis, as well as a higher stable form of nitrogen in the fertilizer. The produced fertilizer was also found rich in supplements of iron with 4 mg/kg of fertilizer produced. The presence of iron in the fertilizer reduced the nitrogen losses in fields up to 20%

It is to be understood that the present methods and compositions are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of obtaining a nitrogen and phosphorous containing fertilizer, the method comprising:
   providing a mixture of about 70% sewage sludge and about 30% corn stover, by weight;
   hydrothermally carbonizing the mixture to provide a slurry; and
   obtaining the nitrogen and phosphorous containing fertilizer,
   wherein the nitrogen and phosphorous containing fertilizer has about 6.25% nitrogen content and about 5.62% phosphate content as measured on a dry weight basis.

2. The method of claim 1, wherein the mixture is hydrothermally carbonized at a temperature of about 200° C. to about 280° C.

3. The method of claim 1, wherein the mixture is hydrothermally carbonized at a pressure of about 3 bar.

4. The method of claim 1, wherein the mixture is hydrothermally carbonized with a reaction time of about 4 to about 6 hours and a biomass and water ratio of about 1:10.

5. The method of claim 1, wherein the mixture further comprises ferric chloride ($FeCl_3$).

6. The method of claim 5, wherein the mixture comprises about 5 mg/kg of the ferric chloride on a dry weight basis.

7. The method of claim 5, wherein the nitrogen and phosphorous containing fertilizer has about 4 mg/kg of iron as measured on a dry weight basis.

8. A nitrogen and phosphorous containing fertilizer produced according to the method of claim 6.

9. A method of fertilizing soil, comprising:
providing the nitrogen and phosphorous containing fertilizer of claim 8;
contacting the nitrogen and phosphorous containing fertilizer with the soil; and fertilizing the soil.

10. The method of claim 9, wherein the soil is kitchen gardening soil.

11. The method of claim 9, wherein the nitrogen and phosphorous containing fertilizer reduces nitrogen loss in the soil by up to 20%.

12. A method of obtaining a nitrogen and phosphorous containing fertilizer, the method comprising:
providing a mixture of about 70% sewage sludge and about 30% corn stover, by weight;
hydrothermally carbonizing the mixture to provide a slurry; and
obtaining the nitrogen and phosphorous containing fertilizer,
wherein the mixture further comprises ferric chloride (FeCl3), and
wherein the mixture comprises about 5 mg/kg of the ferric chloride on a dry weight basis.

13. The method of claim 12, wherein the nitrogen and phosphorous containing fertilizer has about 6.67% nitrogen content as measured on a dry weight basis.

14. The method of claim 12, wherein the nitrogen and phosphorous containing fertilizer has about 4 mg/kg of iron as measured on a dry weight basis.

\* \* \* \* \*